Figure 1:
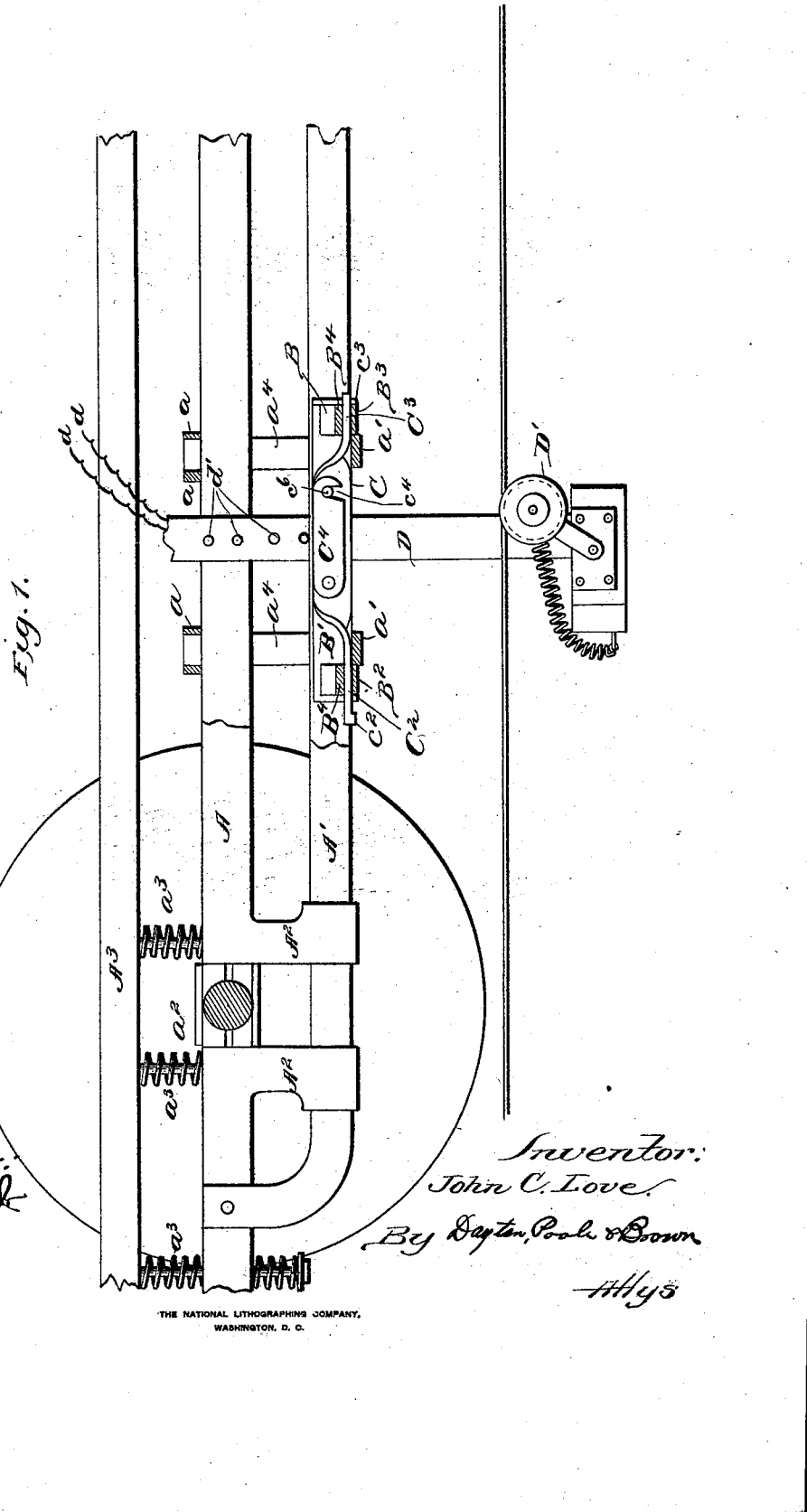

(No Model.) 2 Sheets—Sheet 1.

J. C. LOVE.
TROLLEY BAR CARRIER FOR CARS.

No. 511,346. Patented Dec. 26, 1893.

(No Model.) 2 Sheets—Sheet 2.

J. C. LOVE.
TROLLEY BAR CARRIER FOR CARS.

No. 511,346. Patented Dec. 26, 1893.

Witnesses:
J. M. Fowler Jr.
C. W. Neal

Inventor:
John C. Love
By Dayton, Poole & Brown
Attys.

UNITED STATES PATENT OFFICE.

JOHN C. LOVE, OF PHILADELPHIA, PENNSYLVANIA, ASSIGNOR TO THE LOVE ELECTRIC TRACTION COMPANY, OF CHICAGO, ILLINOIS.

TROLLEY-BAR CARRIER FOR CARS.

SPECIFICATION forming part of Letters Patent No. 511,346, dated December 26, 1893.

Application filed January 21, 1893. Renewed November 11, 1893. Serial No. 490,700. (No model.)

*To all whom it may concern:*

Be it known that I, JOHN C. LOVE, of Philadelphia, in the county of Philadelphia and State of Pennsylvania, have invented certain new and useful Improvements in Trolley-Bar Carriers for Cars; and I do hereby declare that the following is a full, clear, and exact description thereof, reference being had to the accompanying drawings, and to the letters of reference marked thereon, which form a part of this specification.

This invention relates to that class of electric traction systems wherein power is carried from a generator situated at some fixed point, to the cars or other vehicles, by conductors supported in a conduit arranged parallel with the tram rails, or practically so.

The devices hereinafter described are designed with special reference to sustaining the trolley supporting bar which extends from the car downward into the slot of the conduit and carries the trolleys or other traveling contact device. In such systems it is desirable, for many reasons, that the trolley bar, should maintain a fixed lateral relation to the slot of the conduit within which it travels notwithstanding the lateral movement, with relation to said slot, of the car body, or car truck, upon which the upper end of said trolley bar is supported, as for instance to avoid cramping or binding of the trolley bar in the slot of the conduit, or in systems where two conductors are used, to enable the bar to maintain constantly a vertical position and to thus insure the equal pressure of the contact devices upon the respective conductors. It is also desirable that the carrier or frame which immediately supports the trolley bar, and from which the said trolley bar depends, be pivotally connected with the car body in advance (referring to the direction of motion of the car) of said trolley bar at a point somewhat distant therefrom, in order to afford the necessary freedom of lateral movement in the trolley bar, and at the same time to rigidly support the bar, notwithstanding contact of the same with pebbles or other slight obstructions that may lodge in the slot of the conduit. While these ends are attained by the construction shown in an application heretofore filed by me embodying a trolley carrier having its forward end confined and its rear end free to move bodily upon its supports transversely of the car body, in the use of such construction the services of an attendant are required, at the time of reversing the direction of travel of the car, to remove, release, or shift the confining or pivoting device of one end of the trolley carrier, and set a similar device at the other end thereof.

The object of my present invention is to render the adjustment of the trolley bar carrier entirely automatic, and to this end the invention consists in the matters to be hereinafter described, and then particularly pointed out in the claims.

In the form of device hereinbefore referred to as embodied in my prior application, the trolley bar is supported in a longitudinally arranged carrier having lateral movement upon transverse horizontal supports. Centering devices are provided, one for each end of the carrier, to secure or confine that end which is nearest the end of the car which at the time is forward, leaving the rear or following end to shift freely in a lateral direction to compensate for the lateral movements of the car or truck with relation to the slot rail of the conduit as in traversing curves, or in cases where the parallelism of the tram rails with said slot rail is not accurately maintained. This arrangement requires the attention of an attendant to adjust the centering devices when it is desired to reverse the direction of travel of the car, as for instance, at the opposite terminal of a road, in order that the opposite end of the carrier frame, which is now to be the forward end, may be confined, and the other end released and left free to shift laterally upon its supports as before explained.

In constructing the trolley bar carrying devices according to my present invention, centering devices such as hereinbefore referred to are dispensed with, the relative arrangement and construction of the trolley bar carrier and its supports being such that the reversal of direction of the car will cause that end of the carrier which is in advance to be automatically shifted to a position approximately in vertical alignment with the slot rail of the conduit.

Figure 2:
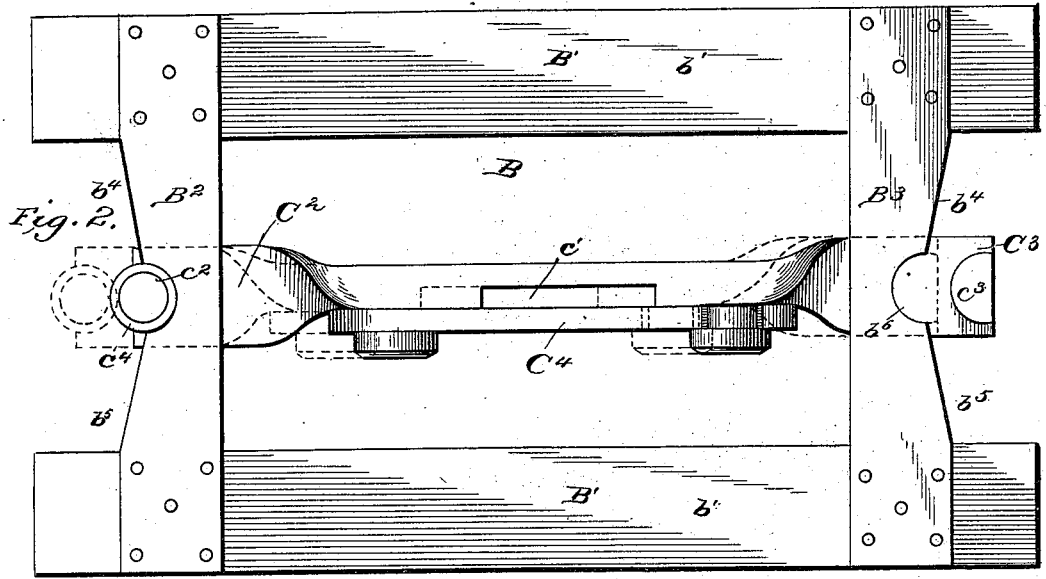
Figure 3:
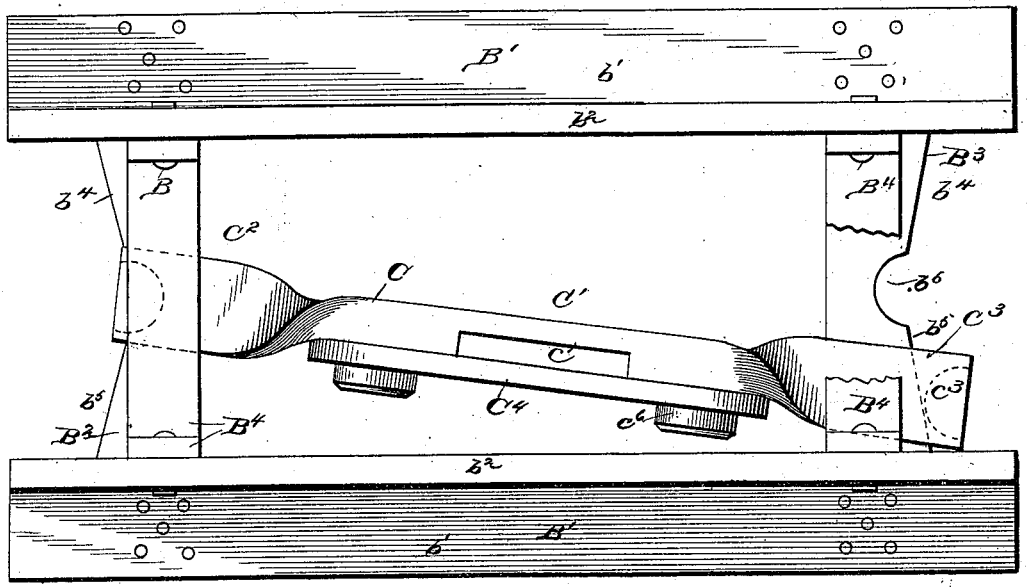
Figure 4:
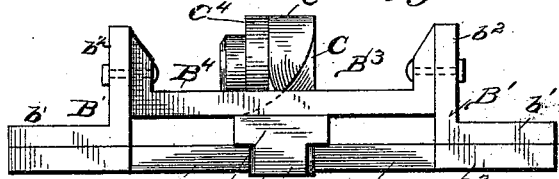

In the accompanying drawings which illustrate my invention: Figure 1— is a vertical longitudinal section taken through the truck frame of a car, the trolley bar and its carrier being shown in side elevation. Fig. 2— is a bottom plan view on a larger scale showing the carrier and its supporting frame detached from the truck frame. Fig. 3— is a top plan of the same, some of the parts being broken away for clearer illustration. Fig. 4— is an end elevation of the carrier.

Referring to the said drawings, A and A' designate the side beams of the truck frame of a car, to cross girts $a'$ of which the supporting frame B of the trolley carrier C is attached at its ends.

The truck frame may be of any usual or preferred construction, that shown herein consisting of longitudinal side beams A A, and A' A' connected at suitable points throughout their length by cross girts of any approved pattern, though I have shown herein only those cross girts $a$ and $a'$ as bear direct relation to the parts to be hereinafter described. These side beams A and A', as shown, are connected by stay posts or bolts $A^2 A^2$ between which the bearing boxes $a^2$ for the wheel axles are secured, and resting upon the beams A A are coiled or other springs $a^3$ to support the side sills $A^3 A^3$ of the car. As here indicated the cross girts $a$ and $a'$ extend laterally across the truck frame and at right angles to the side beams A and A' thereof, the side beams being braced at these points by the posts $a^4 a^4$ to the upper ends of which the girts $a$ are bolted, the lower girts $a'$ being secured to the lower ends of said posts and to the side beams A'.

The support B for the trolley bar carrier C consists of a rectangular frame comprising longitudinal side bars B' and end bars $B^2$ and $B^3$ the side bars B' being of such length as to rest at their ends upon the cross girts $a'$ of the truck frame. Secured at a short distance above the end bars $B^2$ and $B^3$ and parallel therewith, are keeper bars $B^4$, the space between said keeper bars $B^4$ and end bars $B^2$ and $B^3$ being of proper width to receive the ends of the trolley bar carrier C; such space forming in effect guide slots or ways within which said ends of the carrier C slide and have free lateral movement. As here shown the side bars B' of the supporting frame B are formed of angle iron, one web $b'$ of which extends outward horizontally while the other web $b^2$ rises vertically, as best seen in Fig. 4. The end bars $B^2$ and $B^3$ of this frame are bolted to the under side of the horizontal webs $b'$ of the bars B', at such distance apart (in this instance) that their inner edges will abut against the edges of the cross girts $a'$ thus providing support for said end bars against pressure exerted in the direction of travel, at the same time giving great rigidity to the frame B as a whole. This frame is secured to the cross girts $a'$ by bolts passing through the horizontal webs $b'$ of the side bars B, and through said girts. The outer edge of each end bar $B^2$ and $B^3$ is shaped to form double inclines $b^4$ and $b^5$ terminating at the longitudinal centers of said bars in a notch or recess $b^6$ which is formed at the junction of said inclines $b^4$ and $b^5$, as best shown in Figs. 2 and 3. These inclines $b^4$ and $b^5$ extend from the inner edges of the side bars B' inward, and the notches $b^6$ at the meeting point of said inclines are desirably made of semicircular form, as shown, the purpose of which construction will be presently described.

The trolley bar carrier C comprises a metal bar or frame the central part C' of which is provided midway between its ends $C^2 C^3$ with a vertical rectangular slot $c'$ for the reception of the trolley bar D, said bar or frame being of such length that its ends $C^2 C^3$ may rest upon and be supported by the end bars $B^2$ and $B^3$ of the supporting frame B. At the opposite ends of the carrier frame C are located depending lugs or studs $c^2 c^3$ arranged at a distance apart equal to, or slightly greater than, the distance from the bottom of one of the recesses $b^6$ of one end bar of the supporting frame B to the outer end of the incline $b^4$ or $b^5$ of the opposite end bar of said frame; the purpose of this construction being to permit one of the studs, say $c^2$, to be seated in the notch $b^6$ of one of the end bars, say $B^2$, of frame B, while the opposite end $C^3$ of the carrier bar C is free to play or move laterally upon the other end bar $B^3$ between the side bars B' of said frame, without liability of binding of the stud $c^3$ against the inclines $b^4$ or $b^5$ of said end bar $B^3$. Owing to this construction of the trolley bar carrier C and its supporting frame B, it will be seen that pressure upon the trolley bar D in either direction of travel will cause a rearward longitudinal pressure upon the carrier frame C resulting in bringing the stud $c^2$ or $c^3$ in contact with one of the inclines $b^4$ or $b^5$, and that said stud will travel inward upon said incline and become seated and centered within the notch $b^6$, the opposite end of the carrier being then free to move laterally upon the end bar which supports it. The centering or confining of the forward end of the trolley bar carrier C is thus rendered entirely automatic, said carrier being shifted upon its supporting frame B immediately upon changing the direction of travel of the car, inasmuch as the forward movement of the car in the direction opposite to that in which it has traveled, and the inertia of the trolley bar D and its trolleys combine to exert such rearward pressure upon the carrier as has before been mentioned as effecting its movement.

In the instance illustrated the trolley bar carrier is constructed of a flat metal bar C of somewhat greater length than the distance between the outer edges of the end bars $B^2$ and $B^3$ of the supporting frame B. The centering studs $c^2$ and $c^3$ are secured to the under side of the ends $C^2$ and $C^3$ of said bar C, but may be formed integral therewith. These studs $c^2$ and $c^3$ are preferably cylindric, or semi-cylindric, so as to turn freely in the notches $b^6$ and to insure freedom of travel along the inclines $b^4$ and $b^5$ of the supporting frame end bars $B^2$ and $B^3$, the notches $b^6$ at the centers of said end bars being, as before stated, preferably semi-circular and of such size that the studs will fit loosely therein without undue play, as shown.

In some instances I contemplate providing the studs $c^2$ and $c^3$ with friction rolls $c^4$, as shown at the left hand of Fig. 2 to give greater freedom of travel upon the inclines $b^4$ and $b^5$.

It is desirable that the trolley bar D be seated or held in a guide slot or passage of some depth vertically in order that it may be rigidly maintained in its vertical position. This end is conveniently attained in the construction shown by twisting the central part $C'$ of the bar C a quarter turn, so that said central part $C'$ will stand at right angles to the ends $C^2$ and $C^3$ thereof, the latter resting horizontally in the ways formed by the end bars $B^2$ and $B^3$ of the supporting frame B, and the keeper bars $B^4$ of said frame, while the breadth of the central part $C'$ of said bar C is vertically disposed, as clearly illustrated in Figs. 2 and 3. A vertical notch or groove $c'$ is formed in the flat side face of the central part $C'$ of the bar C, to receive, and form a vertical guide passage for, the trolley bar D, a latch $C^4$ being pivoted to the bar C in such position as to close, or form the fourth side of, the guide passage $c'$ when the latch slot $c^4$ is in engagement with the stud $c^6$ projecting from the vertical face of the bar C.

The trolley bar D here illustrated consists of a flat bar of iron or steel seated vertically in the guide passage $c'$ of the carrier C, and arranged to house the conducting wires $d$ which connect the trolleys or other contact devices $D'$ with the car motor (not shown). The lower end of this trolley bar D travels in the slot of a conduit in a manner well understood and carries trolleys or contact devices $D'$ of any approved pattern which travel in contact with the line conductors E, Fig. 1.

As a convenient means for suspending or holding in position vertically the trolley bar D, it may be provided with a longitudinal series of transverse openings $d'$ to receive a cotter or other pin of sufficient length to rest with its ends upon the top edge of the carrier bar C and the latch $C^4$.

As here illustrated this device is arranged for operation upon a road wherein the slot rail of the conduit is located centrally between the tram rails, but it will be understood that it is equally applicable to roads having the conduit located beside the tram rails, for instance in double track roads having the conduits located between the tracks, as the only changes necessary would relate to the car or truck frame and would not involve changes of or alterations in the trolley bar carrier C or its support B.

It will be also understood that I do not wish to confine myself to any mere details of construction described herein, as such construction is merely illustrative of one form of apparatus in which my invention has been practically embodied.

I intend my claims to cover all mechanical constructions wherein a trolley bar carrier is automatically centered in its supporting frame at that end which may be in advance and is free to move laterally upon said support at its rear end.

It will readily be seen that the same general result will be produced by making the notches and inclines on the trolley bar carrier and by placing the studs on the support, thereby reversing the construction illustrated, but the arrangement shown is preferred for practical use.

I claim as my invention—

1. The combination with a trolley bar carrier which is capable of lateral movement at both ends, of means for automatically confining the advance end of the carrier when the direction of movement of the car is reversed, substantially as described.

2. The combination with a trolley bar carrier which is longitudinally movable relatively to its support, of means actuated by longitudinal pressure on the carrier, acting to laterally confine one end thereof while leaving the other end free to move, substantially as described.

3. The combination of a trolley bar carrier, and a support therefor, said carrier and support being provided with lugs and notches adapted for engagement by a longitudinal movement of the carrier relatively to said support, substantially as described.

4. The combination with a trolley bar carrier and a support therefor, said carrier and support being provided with studs and notches adapted to engage each other by a longitudinal movement of the carrier relatively to the support, of means actuated by the longitudinal movement of the carrier constructed to center the forward end of the carrier so as to bring the lug and notch at that end of the carrier into engagement with each other, substantially as described.

5. The combination of a trolley bar carrier and a support therefor, said carrier and support being provided at each end one with a notch and the other with a stud adapted to engage the notch, the carrier being longitudinally movable relatively to its support, the engaging parts on the carrier and support being placed at such distance apart that those at one end only of the carrier will be in engagement at any one time, substantially as described.

6. The combination of a supporting frame and a trolley bar carrier, one of said members being provided with centering studs, and the other with opposite inclines and a notch or seat for the studs at the end of said inclines, substantially as described.

7. The combination of a supporting frame and a trolley bar carrier, one of said members being provided with centering studs, and the other with oppositely arranged inclines facing each other and with a notch or seat for the studs at the junction of said inclines, substantially as described.

8. The combination of a supporting frame the end bars of which are provided on their outer edges with opposite inclines terminating at their junction in a notch or seat, and a trolley bar carrier supported on said end bars and provided at its ends with studs to engage the inclines and notches of the end bars, substantially as described.

9. The combination of a supporting frame the end bars of which are provided on their outer edges with oppositely arranged inclines terminating at their junction in notches, a trolley bar carrier supported on said end bars, and provided with studs arranged at a distance apart greater than the distance between the notches, substantially as described.

10. The combination of a supporting frame provided at its ends with horizontal ways and with outwardly facing inclines terminating at their junction in notches, and a trolley bar carrier the opposite ends of which are seated in the ways of the frame and provided with studs to engage the said inclines and notches, substantially as described.

In testimony that I claim the foregoing as my invention I affix my signature in presence of two witnesses.

JOHN C. LOVE.

Witnesses:
C. A. NEALE,
CHAS. A. O'NEILL.